United States Patent [19]

Lung et al.

[11] Patent Number: 5,533,175
[45] Date of Patent: Jul. 2, 1996

[54] LOW COST PAGE PRINTER SYSTEM AND METHOD

[75] Inventors: James C. Y. Lung, Santa Clara, Calif.; Holy W. Chi, Taipei, Taiwan

[73] Assignee: Destiny Technology Corporation, Santa Clara, Calif.

[21] Appl. No.: 205,718

[22] Filed: Mar. 4, 1994

[51] Int. Cl.⁶ .................................................. G06K 15/00
[52] U.S. Cl. .......................................... 395/115; 395/114
[58] Field of Search ................................... 395/115, 116, 395/114, 164, 165, 166; 358/404, 444, 261.1, 261.4; 400/61, 62, 70

[56] References Cited

U.S. PATENT DOCUMENTS

| | | | |
|---|---|---|---|
| 3,895,184 | 7/1975 | Komura et al. | 395/114 |
| 4,791,680 | 12/1988 | Yokoe et al. | 358/261.1 |
| 5,337,258 | 8/1994 | Dennis | 395/114 |

*Primary Examiner*—Arthur G. Evans
*Attorney, Agent, or Firm*—Claude A. S. Hamrick

[57] ABSTRACT

A printer controller with a gate array capable of performing image data reception, image data decompression and relocation, image data serialization to reduce the memory and CPU requirements. The controller cooperates with a host computer printer driver and utilizes the host computer to process data from application software into raw bit map data, compresses the raw bit map data, and encodes the raw bit map data for transmission to the printer controller.

The controller includes a dispatcher for keeping track of sequential print data received from the host computer and separating the print data into raw image data and print commands, a CPU which executes the print commands to instruct the printer to start or stop a printing job, report printer status to the host computer, manage printer configuration, etc., a raw bit map buffer for storing raw bit map data received from the dispatcher, a video bit map buffer, a formatter consisting of a decompressor that decompresses the raw bit map data into video bit map data, a relocator that puts the decompressed video bit map data into the video bit map buffer, and an arbiter that arbitrates between memory access requests from the host interface in the dispatcher, the decompressor, the serializer, the local CPU, and memory refresh logic, and a serializer which fetches video bit map data from the video bit map buffer, converts the data from parallel format into serial format, and outputs the video data in synchronization with the print engine unit.

30 Claims, 12 Drawing Sheets

LOW COST PAGE PRINTER SYSTEM AND METHOD

BACKGROUND OF THE INVENTION

1. Field of the Invention

The present invention relates generally to computerized printing systems and methods, and more particularly to a new printing method and printing apparatus having an improved printer controller cooperatively coupled with associated computer resident printer driver software, the printer controller having reduced computational and memory requirements, the computer resident printer driver software being used to perform data processing steps normally accomplished by the printer controller.

2. Brief Description of the Prior Art

Non-impact printers such as laser printers have three major components. The first component is the mechanical portion consisting of the box, the paper tray, the moving mechanism to control paper flow, and the printing mechanism. The second component is the engine that performs the actual image marking process. This process deposits toner (equivalent to ink) on to the paper at the correct places with the help of a laser. The third component is the printer controller which receives data from the host computer, processes the data, and provides the data to the engine. Laser printers have key features such as high print quality, fast printing speed, and quiet printing mechanism.

The information generated by the application software on a host computer is typically a set of drawing commands describing the page contents. The printer driver program on the host computer translates these drawing commands to printer commands which are commands specific to a particular printer. The printer driver generates printer commands that tells the printer how to draw text, graphics, and images rather then all the actual dots that would compose the visual image of the text, graphics, and images. These dots are called bit map data or image data. These commands are sent to the printer controller of the printer.

The printer controller receives drawing commands from the host computer and converts the commands to bit map data. This conversion is called "Rendering". Typically, data equivalent to one page of information is rendered and stored in a bit map buffer. This data is read by the engine interface of the controller and serialized before sending out as video signal to the print engine for printing.

In conventional printer controllers of this type, as shown in FIG. 1, a host interface on the printer controller 11 receives printer commands from the host computer, and a command buffer 12 stores the printer commands. A central processing unit ("CPU") 13 reads the printer commands from the command buffer and executes the printer commands. In the execution of the printer commands, the CPU may access various task programs and font memory. A bit map buffer 16 stores the image data and an engine interface 17 serializes and delivers image data to the printer engine unit.

One problem with the design of the conventional printer is the fact that the processing of image data and the serialization of image data have been recognized as two vital but mutually leveraged tasks for the CPU of the conventional printer controllers. In the development of image data, printer commands are rendered into bit map image data. For example, a printer command may instruct the printer to draw a line and the CPU of the printer controller would calculate the placement of the dots on a piece of paper that would produce the visual image of a line. This process requires a powerful CPU in the printer controller to execute a variety of task programs where multiple memory accesses and many arithmetic operations will have to be performed. In the serialization of image data, image data is read from the bit map buffer, converted from a parallel format to a serial format, and sent as video data to the printer marking engine. Again, these tasks further demand a powerful CPU for the printer controller to coordinate and perform all these tasks.

Another disadvantage associated with conventional printer controllers is the amount of memory required on board the printer controller. One of the most important aspects of a printer controller is to provide a correct printed page without incurring "under-printing". Under-printing is a fatal error condition for the printer where the printer engine is doing the marking but the printer controller is unable to supply serial video data continuously and fast enough to print a complete page. Without video data when the engine is printing, the engine does not know what to mark and the page would not be correctly and completely printed. To ensure a complete and correct print-out of a page, the image data for an entire page has to be rendered before starting the serialization of image data to the printer engine.

When the serialization of image data is started, the processing of image data has to be stopped. This mutually exclusive arrangement effectively prevents the risk of under-printing for all types of printer engine. This strategy may not make the print throughput worse, but it requires a larger memory size to accommodate an entire page of image data, and adding memory chips to a printer controller is expensive.

Once it was understood that the utilization of memory was the primary cost issue for printer controller designs, the banding bit map buffer technique was developed. Theoretically, if the image data processing speed were better than, or at least as good as, the image data serialization speed, there would always be image data available to send to the printer engine, and serialization could begin before an entire page was developed. Thus, the memory space previously needed to store an entire page of image data was no longer necessary and a printer controller could be designed with less memory. Practically, however, since every printer controller has its limitations in terms of performance, memory space of a certain size would be reserved as a buffer to cover under-printing.

In contemporary printer controllers, one approach disclosed in U.S. Pat. No. 5,058 037 introduces a task schedule program and task control table for the CPU to manage the tasks of image data processing and serialization. By executing different task programs, the CPU processes image data, serializes image data, and controls the processing and the serialization tasks. As mentioned before, image data processing and image data serialization are two mutually exclusive but tightly correlated tasks for the printer controller. On one hand, both tasks must allocate enough time to generate sufficient data to meet the printer throughput. On the other hand, each task must leave enough time for the other task to complete its function. To solve this conflict, the disclosed apparatus introduced a task schedule program to control the execution time of the CPU in order to have both tasks performed without conflict. This technique may successfully accomplish the job, but the task schedule program approach does not alleviate the need for a powerful CPU and it does not reduce memory requirement.

Another U.S. Pat. No. 5,136,688 introduced the concept of an intermediate data format that a CPU could easily generate to balance the task of image data processing and image data serialization. The patent suggests that the controller CPU translate the drawing commands received from the host computer into intermediate data before printing is begun. This is a very time consuming task which would have to be completed before printing is commenced. Therefore, once printing is started, the CPU would take very little effort to convert intermediate data into image data, and there will be more time for image data serialization. The conflict between the processing of image data and serialization may well be prevented by this technique, but the translation of drawing commands into intermediate data is time consuming and can not be neglected when considering the overall printer performance. This would reduce printer throughput, and may require more memory to accommodate intermediate data. Moreover, the controller CPU load would not be reduced, and on the contrary, the demand for a powerful CPU would be even higher.

SUMMARY OF THE INVENTION

An object of the present invention is to provide a printer controller that can provide high performance at a low cost, i.e., a printer controller capable of extracting the maximum print throughput with minimum CPU and memory requirement.

Another object of the present invention is to provide a printer controller capable of managing compressed bit map image data received from the host computer, decompressing and relocating the image data to build the exact bit map image of a page on paper.

A further object of the invention is to utilize the computing power of the host computer to minimize the amount of computing done by the printer controller.

Another object of the invention is to reduce the type of work performed by the CPU of the printer controller to simple housekeeping functions such as initiate printer, clear registers, start print job, stop print job, etc.

Still another object is to minimize the amount of memory needed on board the printer controller by optimizing the data transfer rate ratio between the speed of the data transfer from the host computer to the printer controller, the speed of data decompression, and the speed of data serialization.

Yet another object is to minimize the amount of memory needed on board the printer controller by allocating memory access cycles between the processing units within the printer controller to achieve maximum throughput.

Briefly, a printer controller in accordance with the present invention uses a gate array capable of performing image data reception, image data decompression and relocation, image data serialization to reduce the memory requirement for storing image data and decreases the necessity of a very high performance CPU. The controller cooperates with a printer driver, which resides in the host computer and utilizes the host computer to process data from application software into raw bit map data, compresses the raw bit map data, and encodes the raw bit map data for transmission to the printer controller.

The controller includes a dispatcher for keeping track of sequential print data received from the host computer and separating the print data into raw image data and print commands, a central processing unit (CPU) which executes the print commands to instruct the printer to start or stop a printing job, report printer status to the host computer, manage printer configuration and other such house-keeping functions, a raw bit map buffer used for storing raw bit map data received from the dispatcher, a video bit map buffer which stores the video bit map data, a formatter consisting of a decompressor that decompresses the raw bit map data into video bit map data, a relocator that puts the decompressed video bit map data into the desired location in the video bit map buffer, and an arbiter that arbitrates between memory access requests from the host interface in the dispatcher, the decompressor, the serializer, the local CPU, and memory refresh logic, and a serializer which fetches video bit map data from the video bit map buffer, converts the data from parallel format into serial format, and outputs the video data in synchronization with the print engine unit.

In operation, drawing commands and non-drawing commands generated by the application software in a host computer are converted to print data by a printer driver, a software program on the host computer. The printer driver generates print data by rendering all types of drawing commands into bit map data, compresses the bit map data, and delivers the compressed bit map data together with the necessary print commands as print data to the printer. It also encodes non-drawing commands into print commands as well. Thus, the print data consists of compressed bit map data and print commands. The dispatcher on the printer controller receives the print data from the host computer and generates the corresponding handshaking signals as per protocol, extracts the compressed bit map data from the print data, and transfers the bit map data into the raw bit map buffer through direct memory access mechanism to achieve the maximum throughput of the host interface. The dispatcher sends the print commands to the local CPU. The dispatching of raw bit map data is suspended when the raw bit map buffer allocated for storing compressed bit map data is full. The optimally coupled data delivery rates for the host interface of the dispatcher and the formatter can minimize the memory size required for buffering the raw bit map data. The formatter translates the raw bit map data into video bit map data, and delivers the video bit map data at a speed required by the serializer. The formatting of video bit map data is suspended when the video bit map buffer is full. The serializer converts the parallel video bit map data to serial video data at the speed that can cope with the printing rate of the majority of laser printer engines, and delivers video data to the marking engine in response to the operation status from the marking engine. The optimally coupled data delivery rates for the serializer and the formatter can minimize the size of the memory required for buffering the video bit map data.

In summary, the present invention overcomes the two major disadvantages of conventional printers, i.e., the need for a powerful CPU and large amount of memory space. By having the host computer do most of the image development, a printer controller only needs a simple CPU rather than a powerful CPU. In addition, by having task specific, dedicated processing units, tremendous speed gain can be achieved. The previous problem of having one CPU switching back and forth between rendering and serialization no longer exists. The processing units of this invention, i.e. formatter and serializer, operate by checking status of the buffers, and independently processing data contained in the buffers. They are stopped only when there is not enough data or when there is a surplus of data down the data path. These conditions are minimized by harmonizing the processing speed of the processing units, buffer size, engine speed, and host data transfer rate. By allocating memory access cycles among the processing units within the printer controller and by synchronizing processing speed of the processing units, a printer controller needs only a minimal amount of memory.

IN THE DRAWINGS

Figure 8:
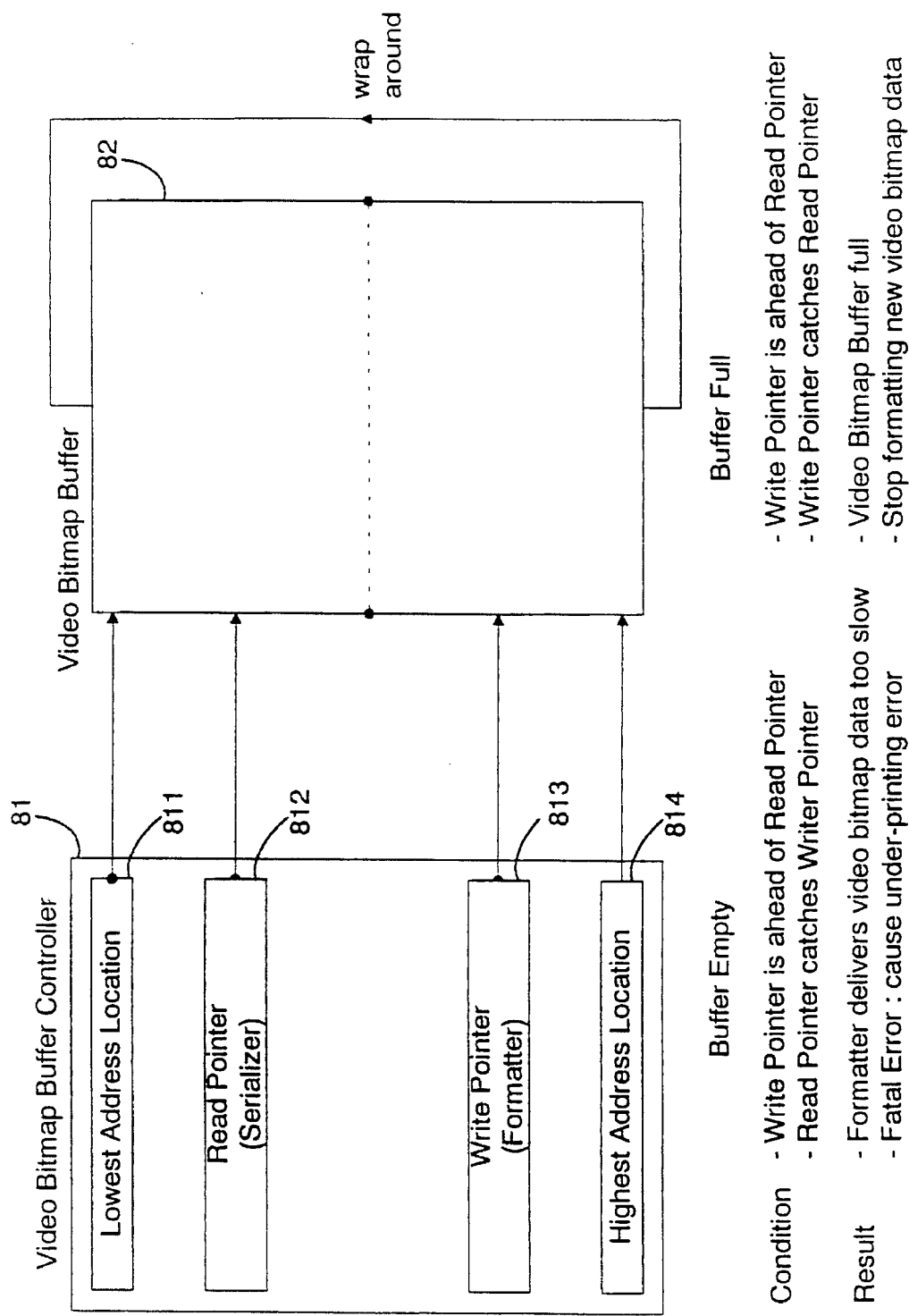

FIGS.. 7A and 7B are state diagrams of the memory arbiter;

FIG. 8 is a block diagram of the video bit map buffer controller; and

Figure 9:
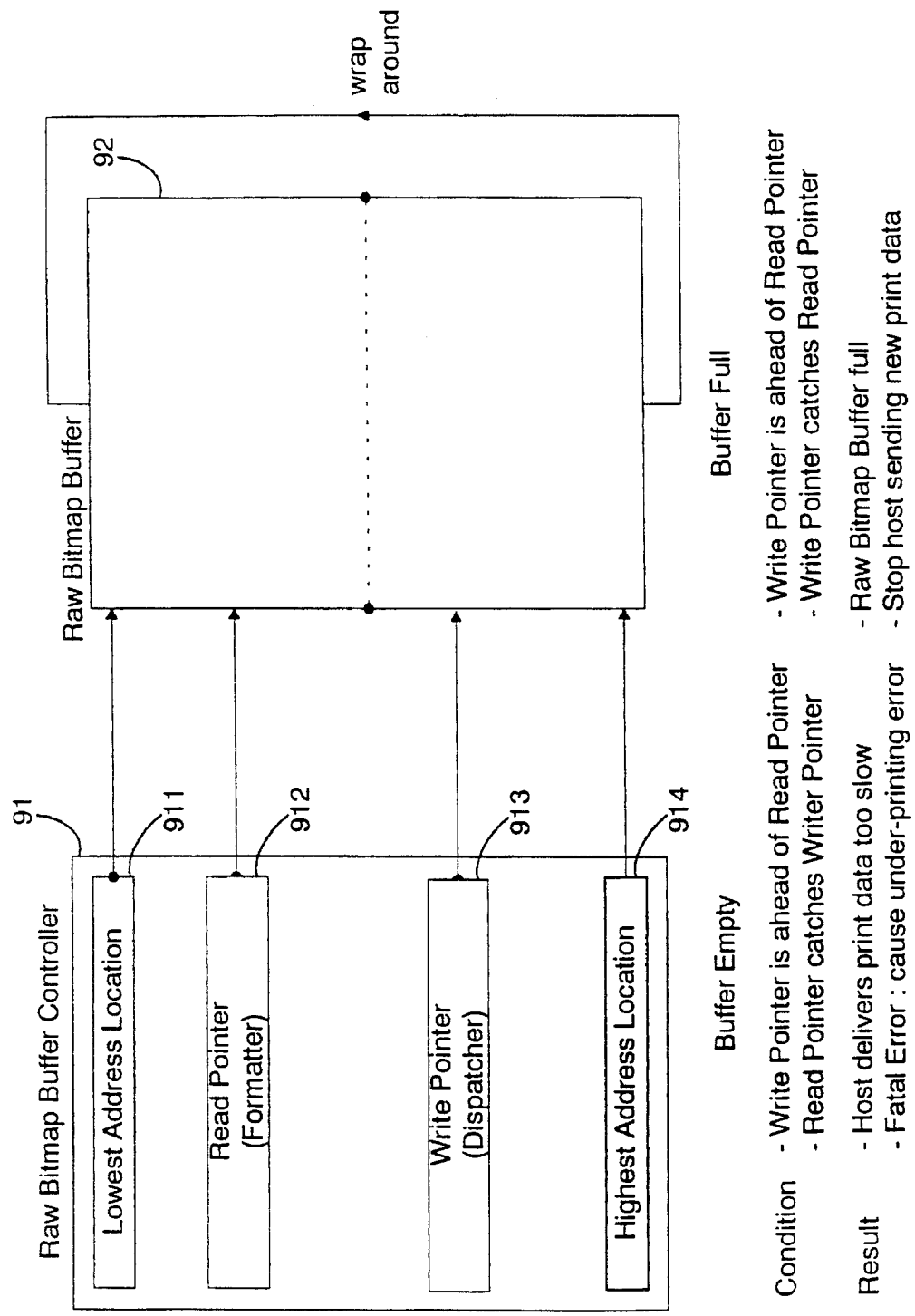

FIG. 9 is a block diagram of the raw bit map buffer controller.

These and other objects and advantages of the present invention will no doubt become apparent to those skilled in the art after having read the following detailed description of the preferred embodiment which is illustrated in the several figures of the drawing. Moreover, not all units and connections between units obvious to those skilled in the art are shown.

DETAILED DESCRIPTION OF THE PREFERRED EMBODIMENT

Figure 1:
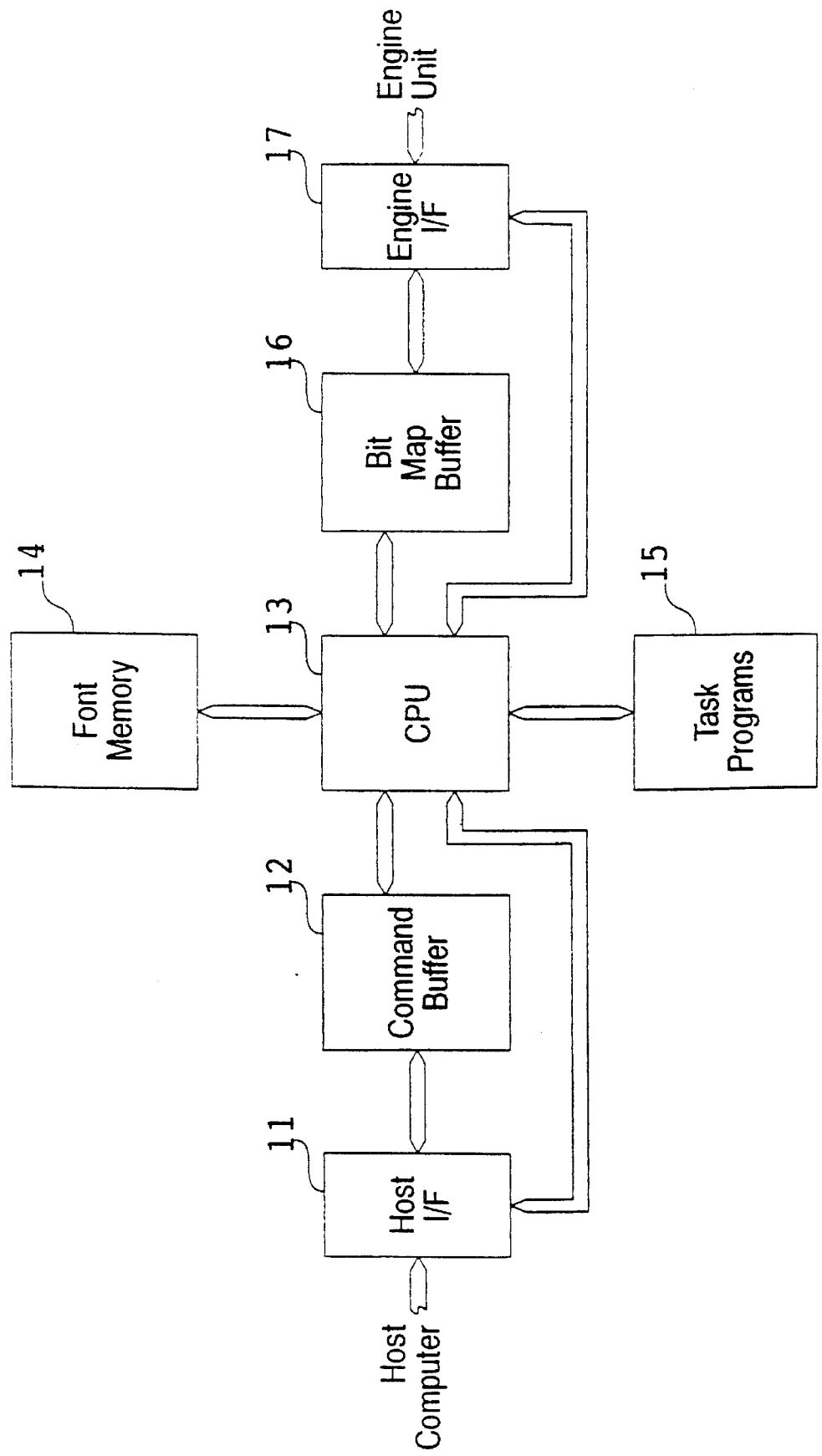
FIG. 1 is a block diagram of a conventional printer controller.
Figure 2A:
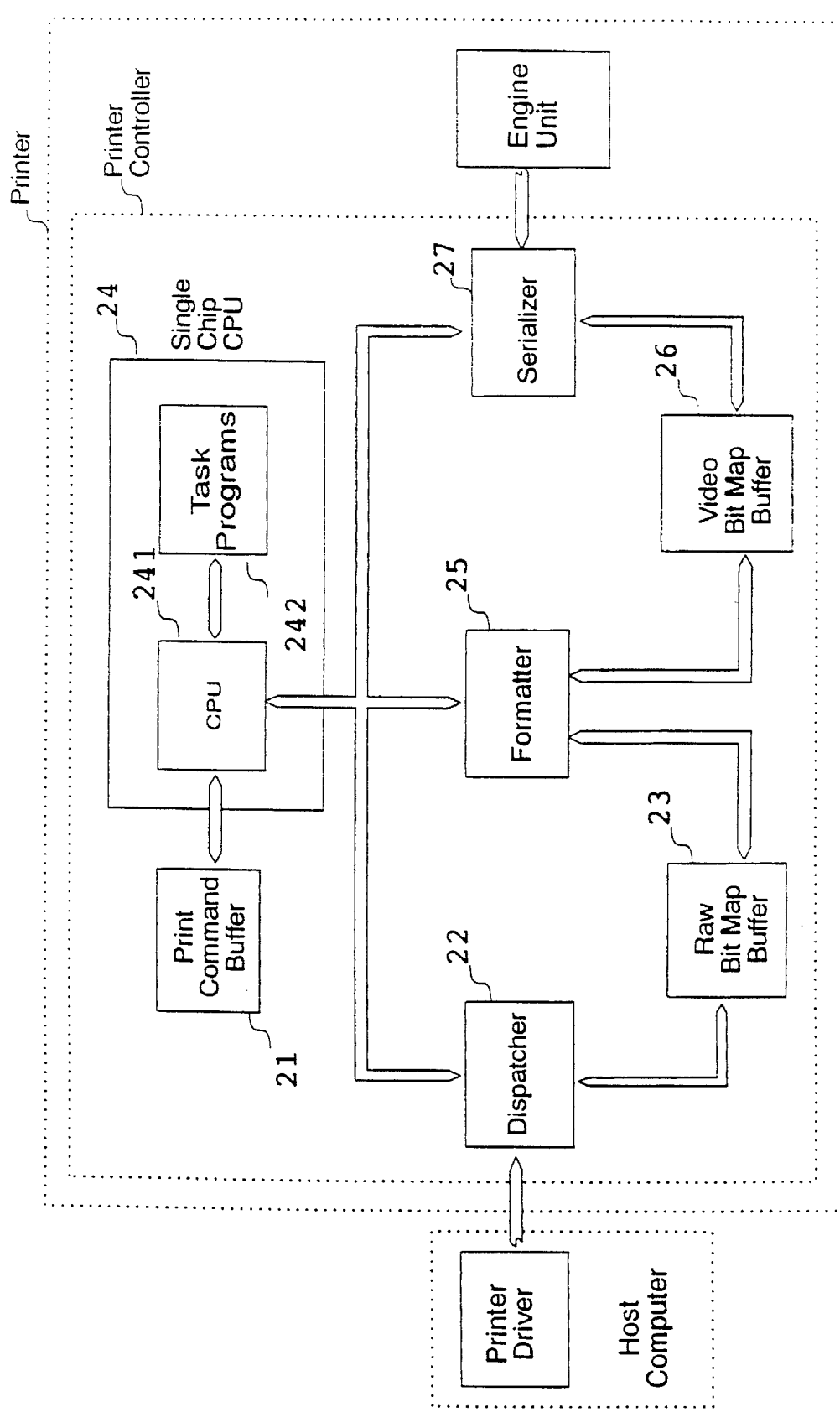
FIG. 2A is a generalized block diagram showing a preferred embodiment of the present invention.

The principal functional elements of the new printer controller are shown in the block diagram of FIG. 2A. A dispatcher 22 interfaces with the host computer to receive print data consisting of print commands and raw bit map data. A print command buffer 21 stores the print commands portion of the print data. A raw bit map buffer 23 stores the raw bit map data portion of the print data. A formatter 25 decompresses raw bit map data to obtain the video bit map data. A video bit map buffer 26 stores the decompressed video bit map data. A serializer 27 which converts the parallel video bit map data to serial video data and outputs the video data to the printer engine. A CPU 241 is also employed to execute task programs 242 as directed by the print commands. The CPU is primarily used for print task management, which includes very simple commands, such as "Start Job Command" to start a print job, "Status Report Command" to report printer status to host computer, and so on. Therefore, an inexpensive CPU 241 along with a small read-only memory (ROM) for housing the task programs would be sufficient to perform the needed functions.

Figure 2B:
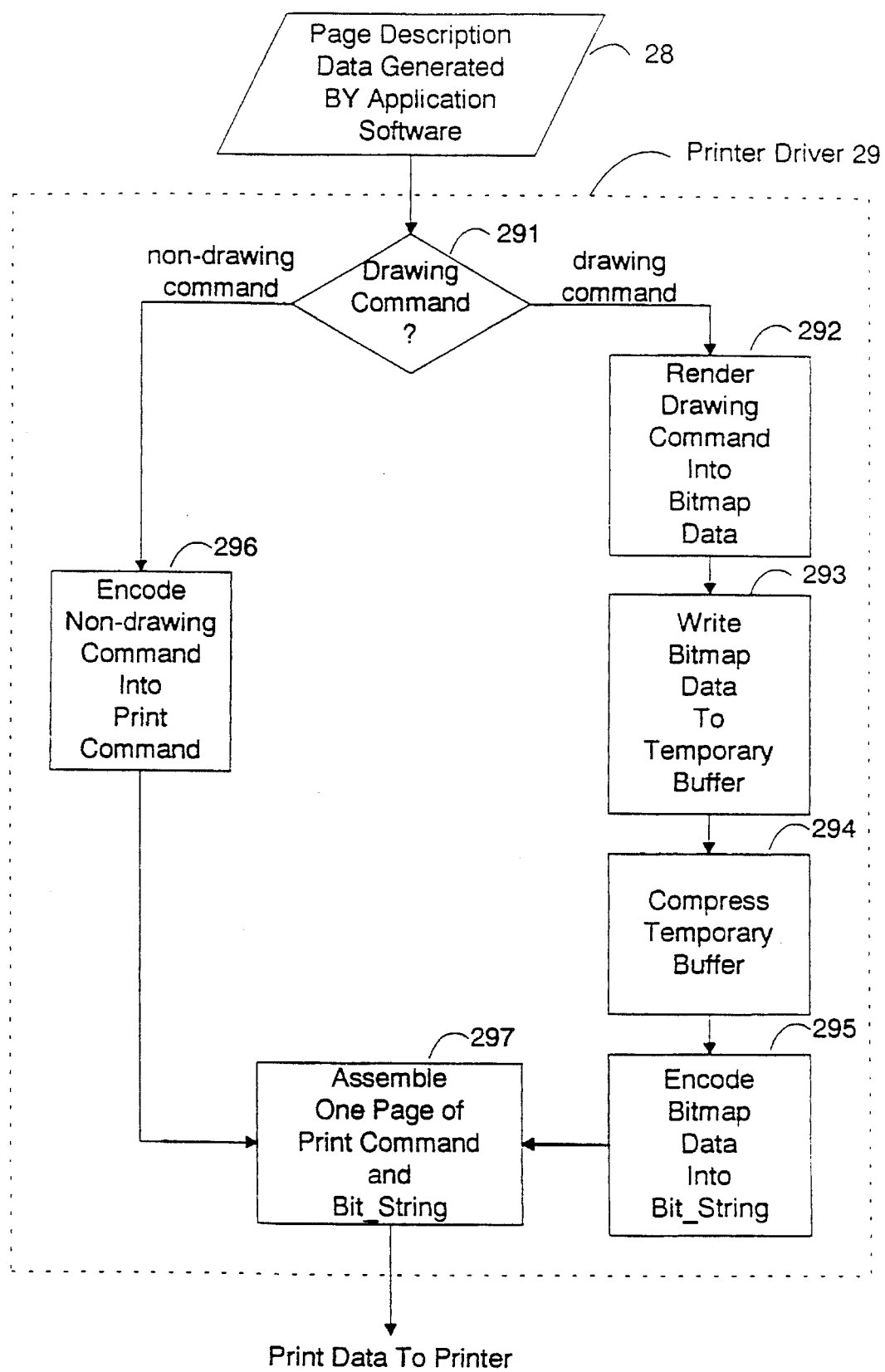
FIG. 2B is a flow chart illustrating the operation of the printer driver of the present invention.

The printer driver, which resides in the host computer, takes direction from the application software and converts the data to be printed into print commands and bit map data. To minimize transmission volume of print data, which improves turnaround time for print data delivery, the printer driver incorporates a special routine to compress bit map data by removing redundant data like white scan lines and repetitive data patterns. So, the printer driver now delivers print data comprised of print commands and compressed bit map data. The operations involved in the printer driver of the present invention are shown in FIG. 2B. The printer driver 29 receives the page description data defining the page contents from the application software. The printer driver first parses the page description data to distinguish the drawing commands and non-drawing commands 291. The drawing commands include character codes, graphic operators, and raster image operators. The drawing commands is rendered into bit map data 292, stored in the temporary buffer 293, then compressed 294 when the temporary buffer is filled up. The compressed bit map data is encoded into bit strings which can be understood by the formatter 25. The non-drawing commands are encoded into print commands 296 which can be parsed by the dispatcher 22. Both the print commands and bit strings are assembled by the printer driver 297, and sent to the printer. The CPU of the host computer is typically more powerful than the CPU of the printer controller and can typically render drawing commands more efficiently than the CPU of the printer.

Print data delivered by the printer driver consists of a sequence of print commands and bit map data, and the dispatcher of the printer controller parses every byte of input data into either bit map data or a print command. For an identified unit of bit map data, the dispatcher requests a memory cycle, and when granted, transfers the bit map data to raw bit map buffer through direct memory access. For an identified print command, the dispatcher simply generates an interrupt to the CPU of the controller. By executing the interrupt routine, the CPU reads in the print command and determines if it should be executed immediately or be stored in the print command buffer for later execution.

Figure 3:
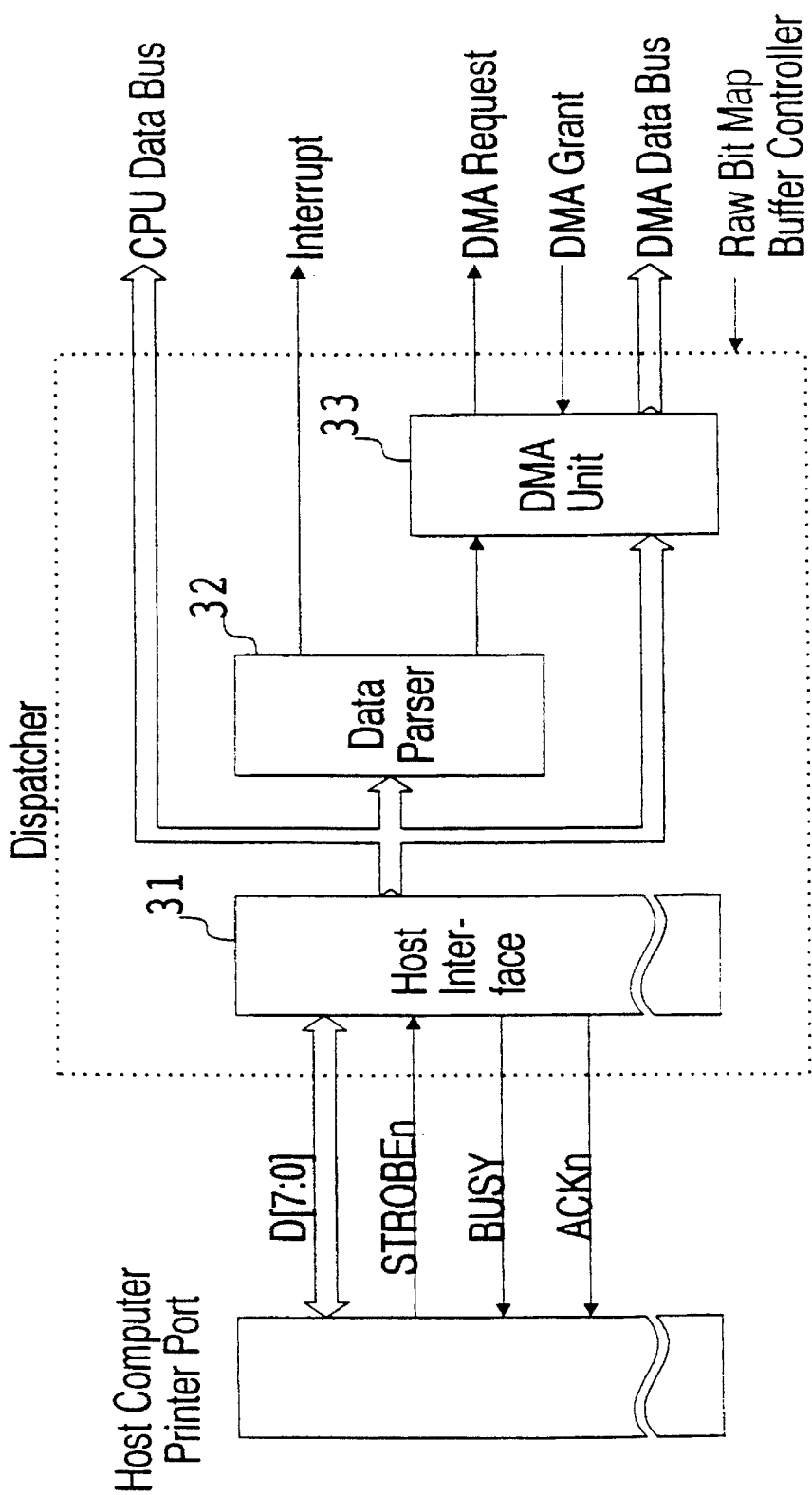
FIG. 3 is a block diagram of the host interface.

To optimize data transfer rate, i.e., to extract the maximum throughput, from the host computer to the printer controller, the dispatcher of the printer controller features a host interface, a data parser, and a Direct Memory Access ("DMA") unit. As shown in FIG. 3, the dispatcher has a host interface 31 to handshake with the host computer. The host interface buffers the incoming print data at the moment STROBEn is active, and asserts BUSY and ACKn according to the communication protocol adopted between the host computer and the printer controller. The data parser 32 is invoked by STROBEn going active. The data parser analyzes the buffered print data, and decides what action to take. If the buffered print data is a print command, the parser will generate an interrupt to the CPU of the controller. If the buffered print data is bit map data, then the parser will signal the DMA unit 33. The DMA unit is responsible for asserting a DMA request signal to the memory arbiter (not shown), and when granted, generates a memory cycle to move the buffered print data into the raw bit map buffer.

The dispatcher generates an interrupt to the CPU of the controller when a print command is received. For executing the interrupt routine, the CPU reads in the print command buffered by the host interface. The CPU determines if the print command is to be executed immediately or be buffered in the print command buffer. A print command saved in the print command buffer will be fetched and executed by the CPU according to the print operation flow.

The bit map data that is moved into the raw bit map buffer by the DMA unit of the dispatcher comprises of a series of bit strings describing the bit map image of the page to be printed. The printer driver, under the control of the host computer, generates bit map data of the page in a compressed bit string format that can be understood by the printer controller. When the printer controller receives the compressed bit map data, it decompresses the previously compressed bit strings to obtain the original uncompressed bit map image data of the page to be printed.

Figure 4A:
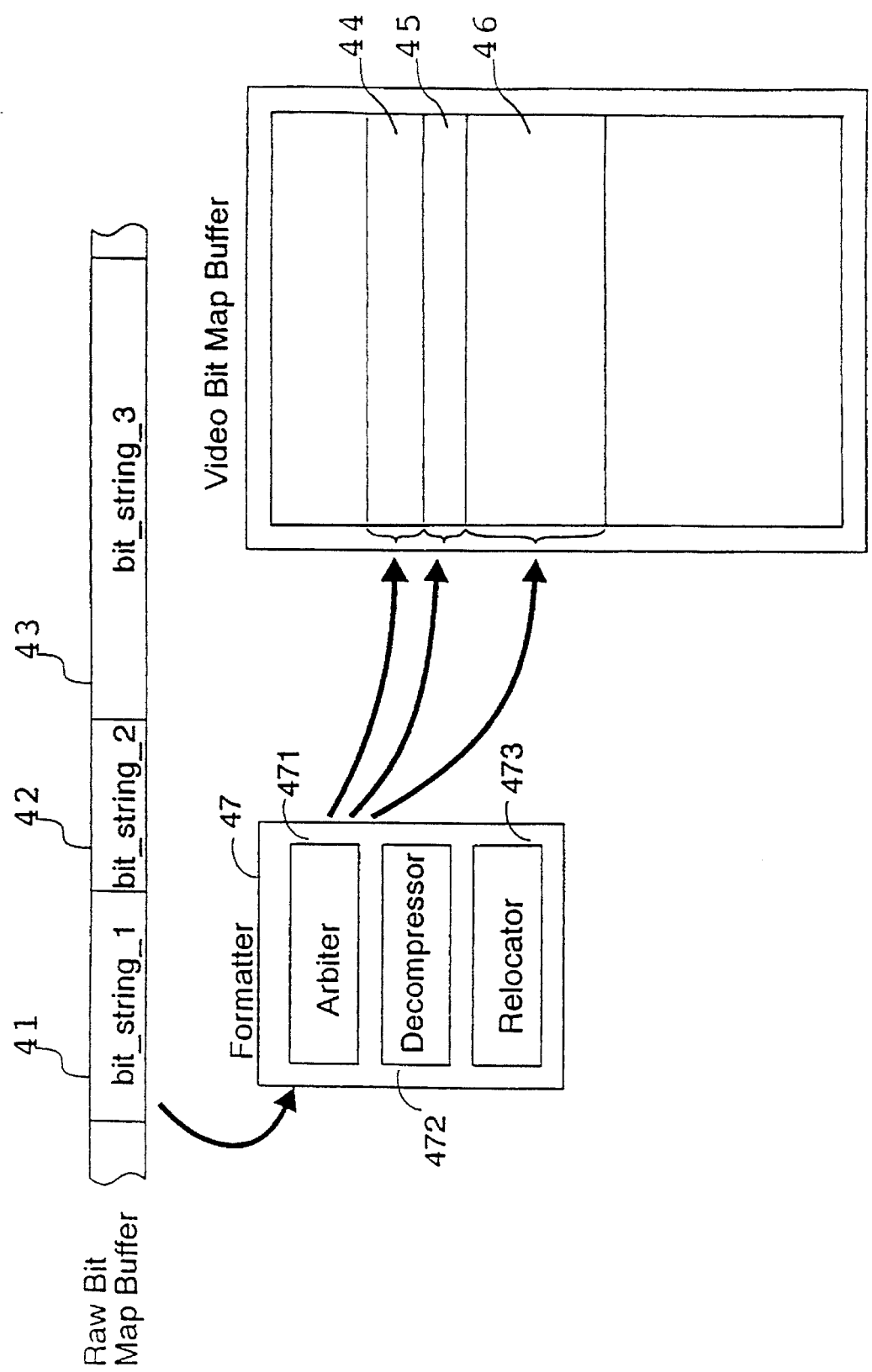
FIG. 4A is a diagram illustrating operation of the bit map data formatter.

Formatting of bit map data is performed by the formatter. As depicted in FIG. 4A, the formatter 47 consists of three functional blocks: an arbiter 471, a decompressor 472, and a relocator 473. The arbiter arbitrates between memory access requests from the host interface, decompressor, serializer, local CPU, and memory refresh logic. The decompressor decompresses the raw bit map data into video bit map data. The relocator puts the video bit map data into the video bit map buffer location corresponding to the relative image location on the page.

The raw bit map buffer stores the raw bit map data and the video bit map buffer stores the resultant video bit map data for printing. For the example shown in FIG. 4A, the formatter reads in bit string_1 41, analyzes the data, and realizes that it is a compressed bit map data string. The formatter then decompresses the raw bit map data associated with bit string_1 and relocates the result at the exact location in the video bit map buffer at 44. The formatter keeps processing the succeeding bit map data read from the raw bit map buffer. When bit string_2 42 is encountered, the formatter recognizes that it is a bit string representing a number of white scan lines. As a consequence, the formatter generates the number of white scan lines data represented by bit string_2 and relocates these white scan lines data at the succeeding location in the video bit map buffer at 45. Next, the formatter processes bit string_3 43. This is again compressed bit map data, and the formatter decompresses the raw bit map data associated with bit string_3 and relocates the results at the succeeding locations in the video bit map buffer at 46.

Figure 4B:
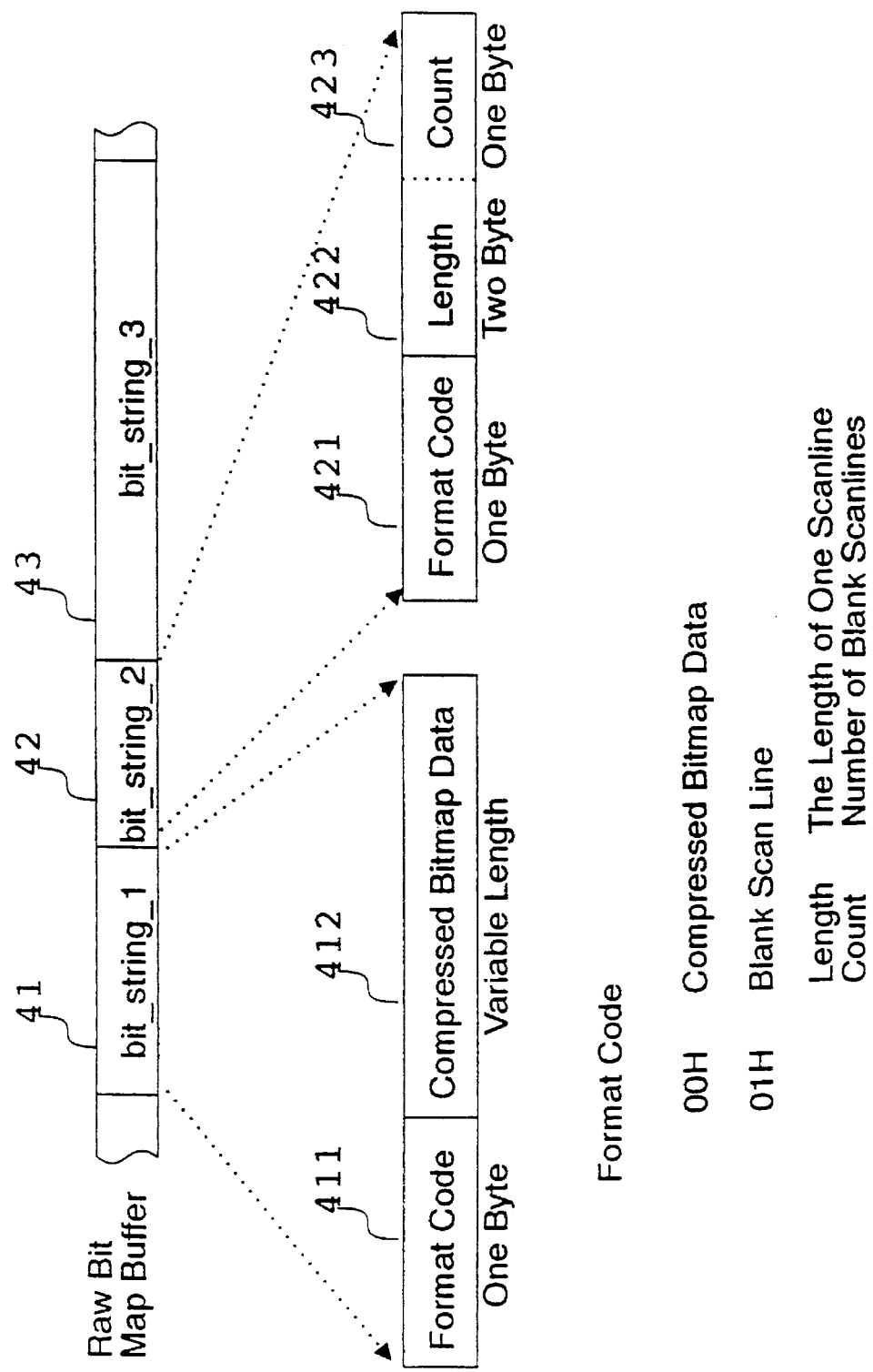
FIG. 4B is a diagram illustrating the raw bit map data format.

As shown in FIG. 4B, each bit string 41, 42, 43 consists of two parts: in each string the first part is one byte of format code 411, 421 which defines the data type of the compressed data; the second part is the compressed data in specific formats. By decoding the format code, the formatter knows how to decompress the compressed data.

The decompressed bit map data is relocated in the video bit map buffer in bit map form ready for printing. When the relocation of bit map data is accomplished by filling the whole or a part of the bit map buffer with decompressed bit map data, the serializer can start to generate the video signal to feed the printer engine.

Figure 5:
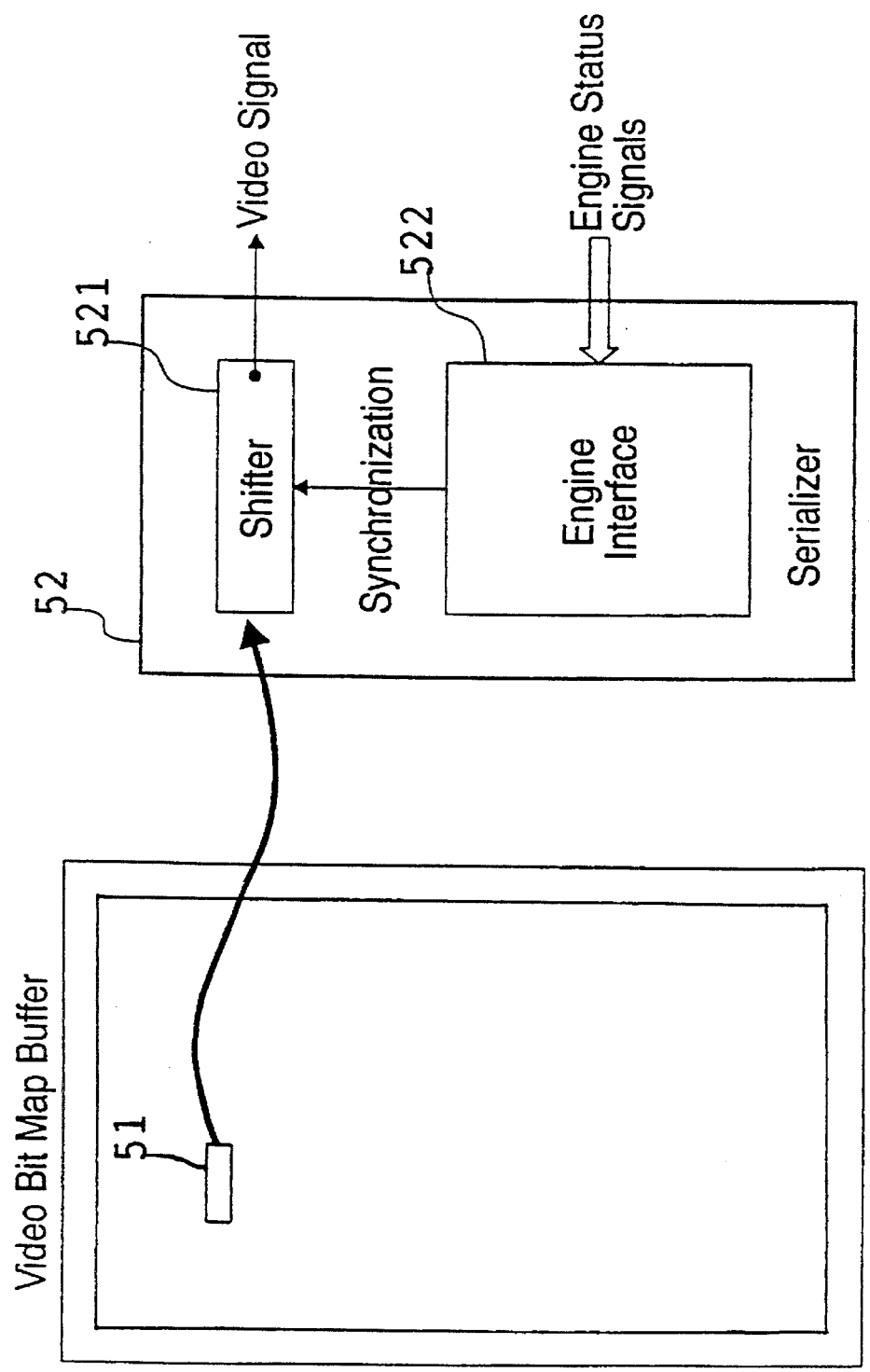
FIG. 5 is a diagram illustrating video data serialization.

Video data serialization in the controller is performed by the serializer 27 (FIG. 2A). The serializer converts the parallel video bit map data into serial video data and transmits it to the printer engine. Referring to FIG. 5, the video data word 51, aligned at 16-bit word boundary, is read from the video bit map buffer and loaded into the shifter 521. The shifter then converts the 16-bit parallel bit map data to serial video data and transmits the serial video data bit by bit to the printer marking engine at the speed determined by the engine interface 522. The serializer 52 consists of the shifter that converts parallel bit map data to serial video data, and the engine interface which manages the engine status to determine the speed of bit map data serialization operation, including direct memory reading of parallel bit map data, loading parallel bit map data to the shifter, and transmitting the serial video data to the printer marking engine.

Figure 6:
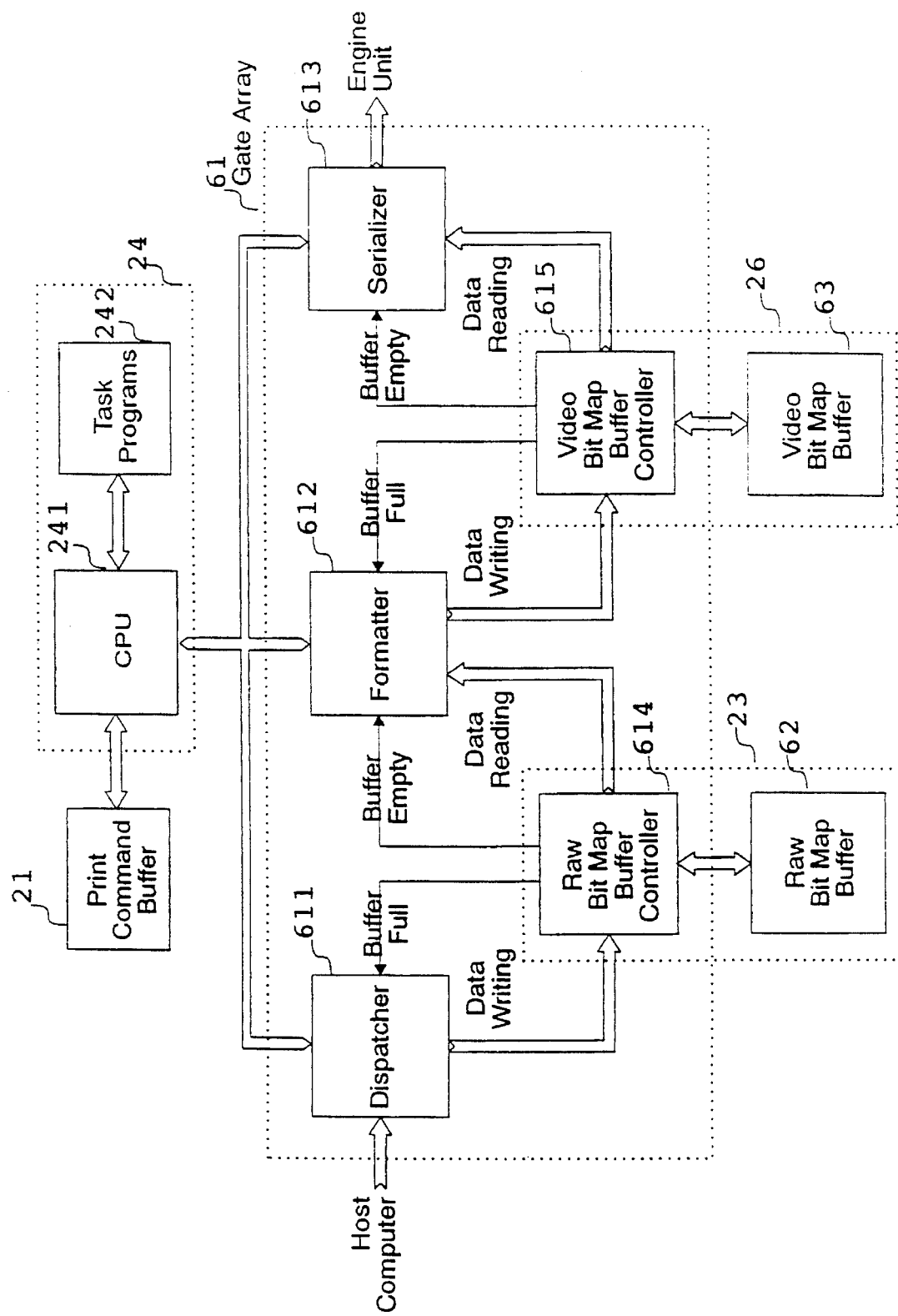
FIG. 6 is a block diagram showing a more detailed implementation of the present invention.

Referring now to FIG. 6, a more detailed functional arrangement of the printer controller is shown to include a gate array and two major buffers. In the right hand section of the gate array is a video bit map buffer controller 615 for managing the access to the video bit map buffer 63 by the formatter 612 and the serializer 613. In the left hand section of the gate array is a raw bit map buffer controller 614 for managing the access to the raw bit map buffer 62 from the dispatcher 611 and the formatter 612. Print command buffer 21 is typically very small, and is not critical for memory size consideration. It is managed by the local CPU 241.

The size of the raw bit map buffer can be monitored and optimized according to the performance difference between print data delivery speed from the host computer and bit map data formatting speed of the formatter. If the print data delivery speed is as fast as the formatting speed of video bit map data, the size of the raw bit map buffer can be reduced. On the contrary, if the print data delivery rate is slower than that of video bit map data formatting rate, the size of the raw bit map buffer must be large enough to buffer sufficient raw bit map data to prevent the fatal under-printing condition.

The size of the video bit map buffer can be monitored and optimized according to the performance difference between bit map data formatting and video data serialization. The video data delivery rate for bit map data serialization is determined by the printer marking engine. If the bit map data formatting speed is as fast as the video data serialization speed, the size of video bit map buffer can be reduced. On the contrary, if the bit map formatting data delivery rate is slower than video data serialization speed, the size of the video bit map buffer must be large enough to buffer sufficient video bit map data to prevent the fatal under-printing condition.

The serializer of the controller will deliver sufficient video data to cope with the printing rate for the majority of laser printer engines. Bit map data formatting speed is closely coupled with video data serialization speed. For the range of printer marking engines the controller can support, this invention monitors, synchronizes, and optimizes the host print data dispatching speed, the bit map data formatting speed, the video serialization speed, and memory bandwidth allocation to memory requesters. Memory bandwidth is defined as the number of bytes of memory data that can be read and written from the memory module per second. Based on the speed requirement of each memory requester, the sizes of the raw bit map buffer and the video bit map buffer can be reduced to a minimum. The following sections describe an example of how minimum printer controller memory size is achieved.

The arbiter arbitrates between memory access requests from the host interface, decompressor, serializer, memory refresh logic, and local CPU. The first three requesters consume most of the memory bandwidth. An analysis has been made to optimize the utilization of memory bandwidth for memory requesters, based on the speed requirement of each requester so that the controller memory size can be reduced.

The following definitions are provided:

Host Data Rate (Hr) defines how much print data per second the host computer needs to deliver to the printer controller in order to meet the printing speed requirement.

Decompressor Data Rate (Dr) defines how much decompressed and relocated bit map data per second the formatter needs to deliver to the video bit map buffer in order to meet the printing speed requirement.

Video Data Rate (Vr) defines how much video data per second the serializer needs to deliver to the printer marking engine in order to meet the printing speed requirement.

For a 300 dpi, letter size paper marking engine, one megabyte of memory is required to represent a full page of bit map data. The printer driver on the host computer can typically compress the bit map data into half. Therefore to print one page, the host computer needs to send 0.5 megabyte of print data to the printer. The decompression algorithm used in this invention is a dictionary based algorithm. The dictionary stores the patterns which are found repetitively in the uncompressed source bit map data. By encoding the most frequently found patterns in the source bit map data with the codes of using much smaller number of bits, the source data gets compressed. To generate one byte of decompressed video bit map data, the decompressor needs to read the raw bit map data and the dictionary information, perform the decompression operation, then write the decompressed bit map data to video bit map buffer. On average, 2.5 bytes of memory accesses are required to generate one byte of decompressed data. Therefore, 2.5 megabytes of memory accesses are required to generate one megabyte of video bit map data. To summarize, if one half megabyte of compressed data is sent to the printer controller, the decompressor in the printer controller accesses about 2.5 megabyte of information to decompress the data into one megabyte of video data, and the serializer sends this one megabyte of information, which is about one printed page, to the printer engine. So the optimum speed allocation and memory bandwidth allocation ratio for this case is:

Hr:Dr:Vr=1:5:2

Figure 7A:
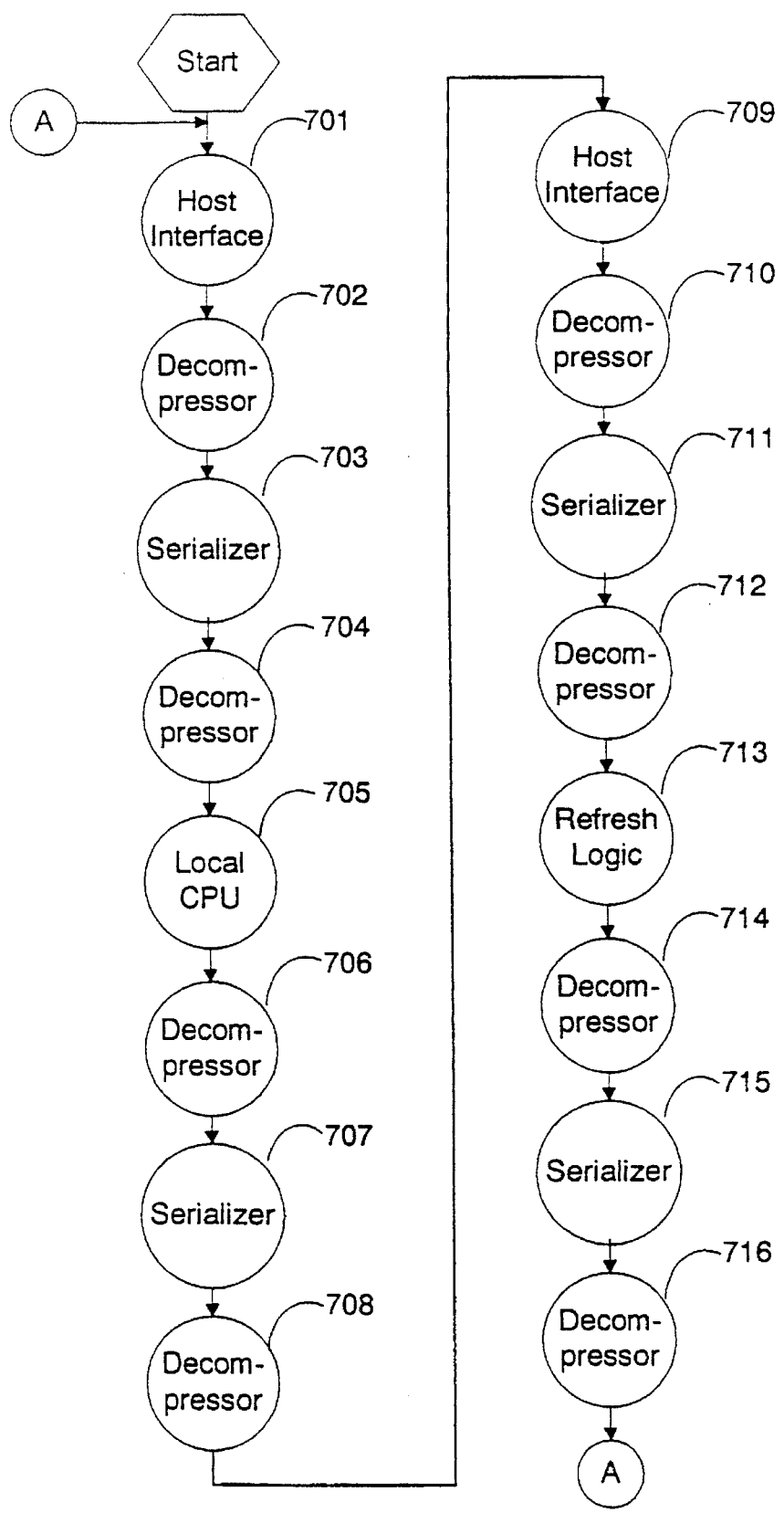
Figure 7B:
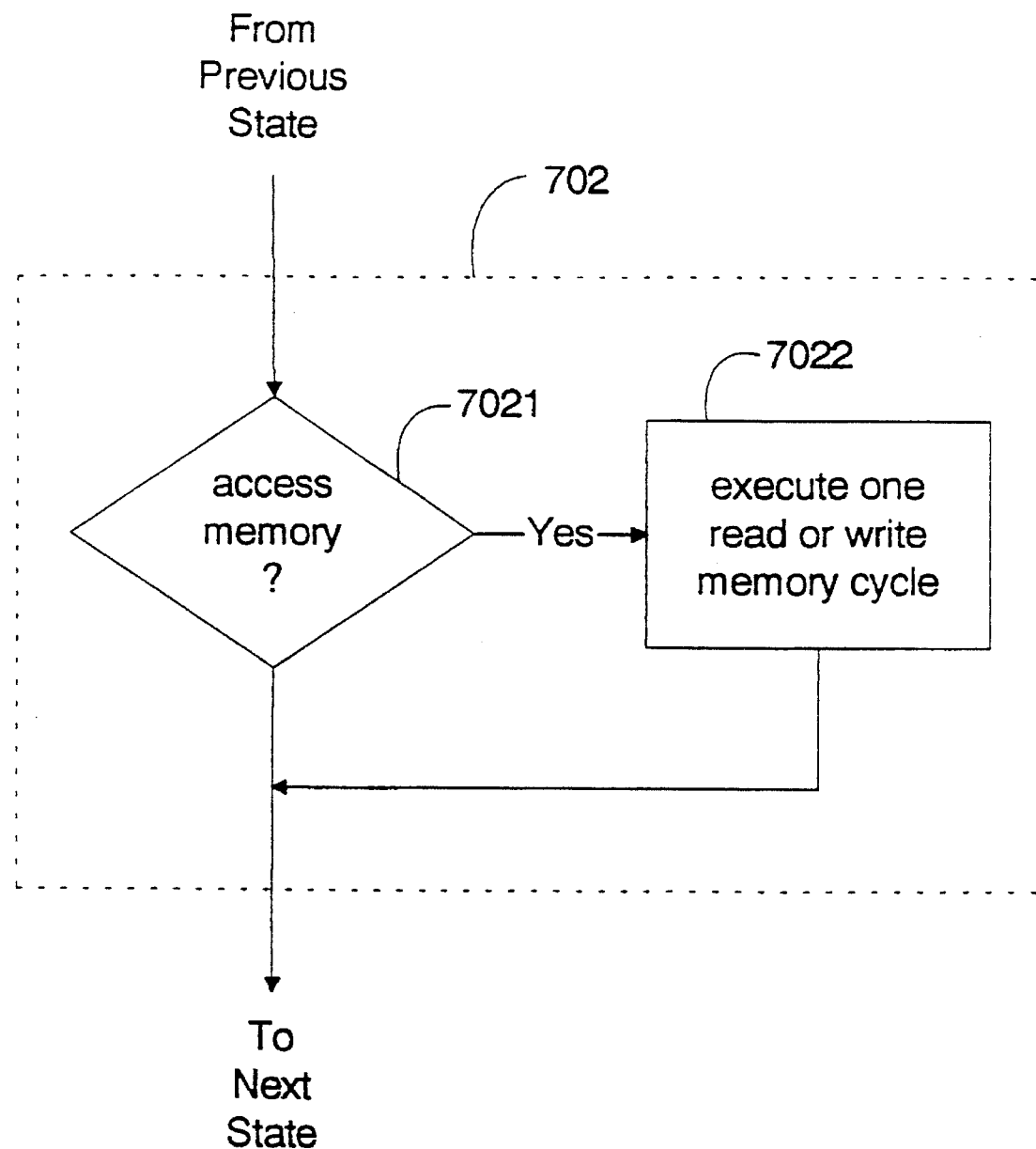

Since the local CPU and memory refresh logic also consume a small portion of memory bandwidth, some memory bandwidth should be allocated for local CPU and memory refresh logic. The speed requirement for the local CPU and memory refresh logic is not critical in the current invention. FIG. 7A and FIG. 7B show an example of a state diagram of the arbiter with memory bandwidth allocation:

Hr:Dr:Vr:Rr:Pr=2:8:4:1:1

Where Rr is the memory refresh rate, and Pr is the memory access rate of the local CPU.

FIG. 7A is a 16 state, round-robin state diagram. At each state, the pertinent memory requestor is polled for memory access. Out of the 16 states, two states 701, 709 are allocated for the host interface; eight states 702, 704, 706, 708, 710, 712, 714, and 716 are allocated for the decompressor; four states 703, 707, 711, and 715 are allocated for the serializer; one state 705 is allocated for the local CPU; and one state 713 is allocated for the memory refresh logic. FIG. 7B explains the operations involved in the decompressor state 702. The operations involved in other states are identical to state 702.

The size of the raw bit map buffer can be optimized according to the performance difference between print data delivery speed from host computer and bit map data formatting speed of the formatter. The size of the video bit map buffer can be optimized according to the performance difference between bit map data formatting and video data serialization.

Another important factor for reducing memory size is to provide sufficient memory bandwidth for all memory requesters with the smallest data bus width. Memory bandwidth is defined as the number of bytes of memory data that can be read and written from the memory module per second. The wider the memory data bus, the larger the memory bandwidth. A memory module with wider data bus typically requires more memory chips to build, and it is therefore more expensive. The higher performance functional blocks require more memory accesses per second (more memory bandwidth). By allocating the memory bandwidth to the memory requesters according to the performance required, the memory bandwidth is optimally used, and a minimum data bus width can be used.

By designing a formatter whose decompression and relocation speed (Dr) is approximately five times the speed of the host data rate (Hr), and a serializer whose video data serialization speed (Vr) is approximately two times the speed of the host data rate (Hr); and by designing the memory arbiter to allocate the memory bandwidth approximately according to the ratio of Hr:Dr:Vr, the memory is fully utilized, and therefore the memory size can be reduced.

Referring to FIG. 8, the video bit map buffer controller 81 (615 in FIG. 6), offers two separate pointers: read pointer 812 and write pointer 813 for the formatter and the serializer to access the video bit map buffer. The video bit map buffer controller manages the two pointers. When either one of the two pointers reaches the highest address location 814, the address of the lowest address location 811 is loaded in that pointer. By comparing the contents of the two pointers, the video bit map buffer controller detects if a "Buffer Empty" or "Buffer Full" condition has occurred in the video bit map buffer.

The buffer empty condition for the video bit map buffer is recognized as a fatal under-printing condition that will cause incorrect print out. This condition means the formatting of video bit map data could not catch up with the serialization of video data. This happens when a printer marking engine demands higher video data rate than what the controller can deliver. The buffer full condition for the video bit map buffer occurs when the formatter delivers bit map data to the video bit map buffer faster than the serializer can fetch and convert the bit map data into video data. Once the video bit map buffer controller detects this condition, it asserts the "Buffer Full" signal to the formatter. Formatting of video bit map data is stopped when the video bit map buffer is full.

Referring to FIG. 9, the raw bit map buffer controller 91 (614 in FIG. 6) manages the access of the raw bit map buffer 92 (62 in FIG. 6) for the dispatcher 611 and the formatter 612 of FIG. 6. Again, the raw bit map buffer controller has two separate pointers: read pointer 912 and write pointer 913 for the dispatcher and the formatter to access the raw bit map buffer. The raw bit map buffer controller operates the raw bit map buffer 92 (62 in FIG. 6) as a ring storage. When either one of the two pointers reaches the highest address location 914, the address of the lowest address location 911 is loaded into that pointer. By comparing the contents of the two pointers, the raw bit map buffer controller detects if "Buffer Empty" or "Buffer Full" condition has occurred in the raw bit map buffer.

The buffer empty condition for the raw bit map buffer is recognized as a fatal error condition that might cause incorrect print out. This buffer empty condition means that the host computer could not deliver as much print data as needed by the formatter. If the throughput of the host computer is lower than the specified minimum, or if the printer marking engine requires a higher video data rate than the maximum specification of the controller, then a buffer empty condition occurs. The buffer full condition for the raw bit map buffer will happen when the host computer delivers print data into the raw bit map buffer faster than the formatter can process it. When the raw bit map buffer controller detects this condition, it asserts "Buffer Full" signal to the host computer through the host interface module to stop the host from sending new print data to the printer. When the raw bit map buffer is full, the controller stops receiving further print data.

Error recovery is provided for in the two possible fatal under-printing conditions described above. In the case of video bit map buffer under-printing, the raw bit map buffer is checked to see if video bit map data can be reconstructed from the raw bit map buffer. If this is not possible, the host computer is asked to resend the needed data. Similarly, in the case of raw bit map buffer under-printing, the host computer is asked to resend the data. In either case, a correct and complete printed page would be the result.

Although the present invention has been described above in terms of a specific embodiment, it is anticipated that alterations and modifications thereof will no doubt become apparent to those skilled in the art. It is therefore intended that the following claims be interpreted as covering all such alterations and modifications as fall within the true spirit and scope of the invention.

What is claimed is:

1. A method of converting application data into video signals for driving a print engine, comprising the steps of:

providing printer driver software for use in a host computer for processing and compressing application data generated by application software to develop print data including print commands and raw bit map data; and providing a printer controller including a central processing unit, a first buffer means, and a second buffer means, a) parsing the print data into print commands and raw bit map data, b) sending the print commands to said central processing unit in the printer controller to provide print task management, c) checking the status of said first buffer means to determine whether or not it is full, and
 i) if the status of said first buffer means is not full, storing the raw bit map data in said first buffer means,
 ii) if the status of said first buffer means is full, sending a buffer full signal to said host computer, d) checking the status of said first buffer means to determine whether or not it is empty and checking the status of said second buffer means to determine whether or not it is full,
 i) if the status of said first buffer means is not empty and if the status of said second buffer means is not full,
  1) fetching and decompressing the stored raw bit map data to develop video bit map data,
  2) storing the video bit map data in said second buffer means, e) checking the status of said second buffer means to determine whether or not it is empty,
 i) if the status of said second buffer means is not empty, fetching and serializing the stored video bit map data to develop video signals, and f) using said video signals to drive a print engine.

2. A method as recited in claim 1 wherein the steps of processing and compressing application data in the host computer include the steps of:

a) determining if said application data is a drawing command or a non-drawing command, and
 i) if said application data is a drawing command then
  1) developing the drawing command into bit map data,
  2) compressing the bit map data to provide raw bit map data,
 ii) if said application data is a non-drawing command then encoding said non-drawing command to provide print commands, and b) assembling said print commands and said raw bit map data to provide said print data.

3. A method as recited in claim 2 wherein the step of storing the raw bit map data includes the steps of:

a) requesting direct memory access of said first buffer means;

b) receiving access to said first buffer means; and c) sending the raw bit map data to said first buffer means.

4. A method as recited in claim 3 wherein the step of storing the video bit map data includes the steps of:

a) requesting direct memory access of said second buffer means;

b) receiving access to said second buffer means; and c) sending the video bit map data to said second buffer means.

5. A method as recited in claim 4 wherein the step of sending the print commands to the central processing unit includes the steps of:

a) using the central processing unit to determine if a print command is to be immediately executed or is to be stored in a print command buffer, and
 i) if the print command is to be immediately executed, executing the print command,
 ii) if the print command is to be stored in the print command buffer, storing the print command.

6. A method as recited in claim 5 wherein said central processing unit includes a stored plurality of task programs, and wherein the step of executing the print command is accomplished by executing a task program, the print command per se, or a stored print command.

7. A method as recited in claim 1 wherein the step of storing the raw bit map data includes the steps of:

a) requesting direct memory access of said first buffer means;

b) receiving access to said first buffer means; and c) sending the raw bit map data to said first buffer means.

8. A method as recited in claim 1 wherein the step of storing the video bit map data includes the steps of:

a) requesting direct memory access of said second buffer means;

b) receiving access to said second buffer means; and c) sending the video bit map data to said second buffer means.

9. A method as recited in claim 1 wherein the step of sending the print commands to the central processing unit includes the steps of:

a) using the central processing unit to determine if a print command is to be immediately executed or is to be stored in a print command buffer, and
 i) if the print command is to be immediately executed, executing the print command,
 ii) if the print command is to be stored in the print command buffer, storing the print command.

10. A method as recited in claim 1 wherein said central processing unit includes a stored plurality of task programs, and wherein the step of executing the print command is accomplished by executing a task program, the print command per se, or a stored print command.

11. Apparatus for converting application data into video signals for driving a print engine, comprising:

a) printer driver means for use in a host computer to process and compress application data generated by application software to develop print data including print commands and raw bit map data; and b) a printer controller for receiving the print data and including
 i) dispatching means for parsing the print data into print commands and raw bit map data,
 ii) central processing means responsive to the print commands and operative to provide print task management,
 iii) first buffer means for storing the raw bit map data,
 iv) formatting means for fetching and decompressing the stored raw bit map data to develop video bit map data, v) first buffer controller means for facilitating the storage and fetching of the raw bit map data to and from said first buffer means and for communicating the status of said first buffer means to said dispatching means and said formatting means, vi) second buffer means for storing said video bit map data, vii) serializing means for fetching and serializing the stored video bit map data to develop video signals for driving said print engine, and viii) second buffer controller means for facilitating the storage and fetching of the video bit map data to and from said second buffer means and for communicating the status of said second buffer means to said formatting means and said serializing means.

12. Apparatus as recited in claim 11 wherein said printer driver means includes:

a) means for determining those parts of said application data that are drawing commands and those parts of said application data that are non-drawing commands, b) means for converting said drawing commands into bit map data, c) means for compressing the bit map data, d) means for encoding said non-drawing commands into print commands, and e) means for assembling said print commands and said stored bit map data to provide said print data.

13. Apparatus as recited in claim 12 wherein said dispatching means includes:

a) interface means for communicating with said host computer, b) direct memory access means having a data bus for linking interface means to said first buffer means and to said central processing means, and c) data parsing means operative to determine when print data on said interface means is a print command, in which case it generates an interrupt signal causing said central processing means to retrieve the print command, and when said print data on said interface means is bit map data, in which case it generates a signal causing said first buffer means to retrieve the bit map data.

14. Apparatus as recited in claim 13 wherein said central processing means includes:

a) a processing unit for causing said print commands to be implemented, b) a print command buffer for temporarily storing print commands, and c) storage means for storing task programs that can be accessed and implemented by said processing unit.

15. Apparatus as recited in claim 14 wherein said dispatching means, said first controller means, said formatting means, said second controller means, and said serializing means are all included in a single gate array device.

16. Apparatus as recited in claim 12 wherein said dispatching means includes:

a) interface means for communicating with said host computer, b) direct memory access means having a data bus for linking interface means to said first buffer means and to said central processing means, and c) data parsing means operative to determine when print data on said interface means is a print command, in which case it generates an interrupt signal causing said central processing means to retrieve the print command, and when said print data on said interface means is bit map data, in which case it generates a signal causing said first buffer means to retrieve the bit map data.

17. Apparatus as recited in claim 11 wherein said central processing means includes:

a) a processing unit for causing said print commands to be implemented, b) a print command buffer for temporarily storing print commands, and c) storage means for storing task programs that can be accessed and implemented by said processing unit.

18. Apparatus as recited in claim 11 wherein said dispatching means, said first controller means, said formatting means, said second controller means, and said serializing means are all included in a single gate array device.

19. A printer controller for receiving print data including print commands and raw bit map data, and for converting said raw bit map data to video signals, comprising:

a) dispatching means for parsing the print data into print commands and raw bit map data, b) central processing means responsive to the print commands and operative to provide print task management, c) first buffer means for storing the raw bit map data, d) formatting means for fetching and decompressing the stored raw bit map data to develop video bit map data, e) first buffer controller means for facilitating the storage and fetching of the raw bit map data to and from said first buffer means and for communicating the status of said first buffer means to said dispatching means and said formatting means, f) second buffer means for storing said video bit map data, g) serializing means for fetching and serializing the stored video bit map data to develop video signals for driving a print engine, and h) second buffer controller means for facilitating the storage and fetching of the video bit map data to and from said second buffer means and for communicating the status of said second buffer means to said formatting means and said serializing means.

20. A printer controller as recited in claim 19 wherein said printer driver means includes:

a) means for determining those parts of said application data that are drawing commands and those parts of said application data that are non-drawing commands, b) means for converting said drawing commands into bit map data, c) means for compressing the bit map data, d) means for encoding said non-drawing commands into print commands, and e) means for assembling said print commands and said stored bit map data to provide said print data.

21. Apparatus as recited in claim 20 wherein said dispatching means includes:

a) interface means for communicating with said host computer, b) direct memory access means having a data bus for linking interface means to said first buffer means and to said central processing means, and c) data parsing means operative to determine when print data on said interface means is a print command, in which case it generates an interrupt signal causing said central processing means to retrieve the print command, and when said print data on said interface means is bit map data, in which case it generates a signal causing said first buffer means to retrieve the bit map data.

22. A printer controller as recited in claim 21 wherein said central processing means includes:
   a) a processing unit for causing said print commands to be implemented,
   b) a print command buffer for temporarily storing print commands, and
   c) storage means for storing task programs that can be accessed and implemented by said processing unit.

23. A printer controller as recited in claim 22 wherein said dispatching means, said first controller means, said formatting means, said second controller means, and said serializing means are all included in a single gate array device.

24. Apparatus as recited in claim 19 wherein said dispatching means includes:
   a) interface means for communicating with said host computer,
   b) direct memory access means having a data bus for linking interface means to said first buffer means and to said central processing means, and
   c) data parsing means operative to determine when print data on said interface means is a print command, in which case it generates an interrupt signal causing said central processing means to retrieve the print command, and when said print data on said interface means is bit map data, in which case it generates a signal causing said first buffer means to retrieve the bit map data.

25. A printer controller as recited in claim 19 wherein said central processing means includes:
   a) a processing unit for causing said print commands to be implemented,
   b) a print command buffer for temporarily storing print commands, and
   c) storage means for storing task programs that can be accessed and implemented by said processing unit.

26. A printer controller as recited in claim 19 wherein said dispatching means, said first controller means, said formatting means, said second controller means, and said serializing means are all included in a single gate array device.

27. A method as recited in claim 1 wherein the steps of processing and compressing application data in the host computer include the steps of:
   a) determining if said application data is a drawing command or a non-drawing command, and
      i) if said application data is a drawing command then
         1) developing the drawing command into bit map data,
         2) storing said bit map data in a temporary buffer, and
         3) compressing the stored bit map data to provide raw bit map data,
      ii) if said application data is a non-drawing command then encoding said non-drawing command to provide print commands, and
   b) assembling said print commands and said raw bit map data to provide said print data.

28. Apparatus as recited in claim 11 wherein said printer driver means includes:
   a) means for determining those parts of said application data that are drawing commands and those parts of said application data that are non-drawing commands,
   b) means for converting said drawing commands to bit map data,
   c) means for storing said bit map data in a temporary buffer,
   d) means for compressing the temporarily stored bit map data,
   e) means for encoding said non-drawing commands into print commands, and
   f) means for assembling said print commands and said stored bit map data to provide said print data.

29. Apparatus as recited in claim 11 wherein said dispatching means includes:
   a) interface means for communicating with said host computer,
   b) direct memory access means having a first data bus for communicating bit map data to said first buffer means,
   c) second data bus means linking said interface means to said central processing means and said direct memory access means, and
   d) data parsing means operative to determine when print data on said interface means is a print command, in which case it generates an interrupt, signal causing said central processing means to retrieve the print command, and when said print data on said interface means is bit map data, in which case it generates a signal causing said first buffer means to retrieve the bit map data.

30. Apparatus as recited in claim 19 wherein said dispatching means includes:
   a) interface means for communicating with said host computer,
   b) direct memory access means having a first data bus for communicating bit map data to said first buffer means,
   c) second data bus means linking said interface means to said central processing means and said direct memory access means, and
   d) data parsing means operative to determine when print data on said interface means is a print command, in which case it generates an interrupt signal causing said central processing means to retrieve the print command, and when said print data on said interface means is bit map data, in which case it generates a signal causing said first buffer means to retrieve the bit map data.

* * * * *